United States Patent [19]
Saito et al.

[11] Patent Number: 5,303,118
[45] Date of Patent: Apr. 12, 1994

[54] ELECTRIC DOUBLE LAYER CAPACITOR

[75] Inventors: Takashi Saito; Junji Tabuchi; Yukari Kibi; Atsushi Ochi, all of Tokyo, Japan

[73] Assignee: NEC Corporation, Japan

[21] Appl. No.: 45,613

[22] Filed: Apr. 9, 1993

[30] Foreign Application Priority Data

Apr. 15, 1992 [JP] Japan .................................. 4-095113

[51] Int. Cl.$^5$ .............................................. H01G 9/04
[52] U.S. Cl. .................................... 361/502; 29/25.03
[58] Field of Search ................ 361/502, 526; 29/25.03

[56] References Cited

U.S. PATENT DOCUMENTS 4,604,788  8/1986  Boos ................................... 29/25.03

FOREIGN PATENT DOCUMENTS 0303712  12/1989  Japan ................................. 29/25.03

OTHER PUBLICATIONS

Japanese Patent Laid Open H4-288361 (1992).
Japanese Patent Laid Open S63-226019 (1988).

Primary Examiner—Bruce A. Reynolds
Assistant Examiner—Michael D. Switzer
Attorney, Agent, or Firm—Laff, Whitesel, Conte & Saret

[57] ABSTRACT

An electric double layer capacitor is proposed which is constructed by sandwiching a laminated body of a pair of polarizable electrodes consisting of a porous solid conductive material each impregnated with an electrolytic solution and a platelike ion permeating separator member, between a pair of collectors for external connection terminals, and housing the aggregate in a gasket, wherein the gap between the inner surface of the gasket and the outer surface of the laminated body is filled with an auxiliary electrolytic solution. The auxiliary electrolytic solution consists of glass fibers or water absorbing polymer impregnated with gelatinous electrolytic solution or a liquid electrolytic solution, and replenishes the lost portion due to evaporation and leakage of the electrolytic solution of the electric double layer capacitor. Moreover, this auxiliary electrolytic solution acts as a buffer to mechanical impact externally applied to the capacitor. Therefore, the electric double layer capacitor according to this invention has excellent resistance to high temperature and resistance to impact.

5 Claims, 2 Drawing Sheets

ELECTRIC DOUBLE LAYER CAPACITOR

BACKGROUND OF THE INVENTION

1. Field of the Invention

The present invention relates to an electric double layer capacitor, and more particularly to an electric double layer capacitor which employs polarizable electrodes consisting of activated carbon or the like impregnated with liquid electrolyte (electrolytic solution).

2. Description of the Prior Art

An electric double layer capacitor employs an electric double layer formed at the interface of a porous solid such as activated carbon and an electrolytic solution, formed by impregnating the electrolytic solution to the activated carbon which is electrochemically stable to the electrolytic solution and is electrically conductive, and is capable of easily realizing a large capacitance of the order of farad (F). The large capacitance which reaches 10 to 50 $F/cm^3$ is due to the very small thickness comparable to the diameter of a molecule, of the electric double layer that corresponds to the dielectric layer of the ordinary capacitor, and an extremely large effective surface area of the activated carbon. This large capacity makes it possible to use this kind of capacitor as a substitute for a battery which is the power supply of an IC memory or a microprocessor. Since the polarizable electrode and the electrolytic solution does not give rise to a chemical reaction in charging and discharging, differing from a battery which utilizes an electrochemical phenomenon, the life in the use that is accompanied by a repeated charging and discharging, namely, the life for repetitions charging and discharging is much longer than that of a battery.

However, the equivalent series resistance (ESR) of the electric double layer capacitor is high, despite its large capacitance, so its use is limited such as it is not suited for the removal of high frequency components in a signal processing circuit or for a smoothing circuit for rectifier output. Accordingly, exploitation of new usage that makes advantageous use of its ease in realizing a large capacitance and long life for repetitions charging and discharging has been desired.

Aimed at such new uses, technologies that realize a large capacitance and a low resistance (ESR) are disclosed in Japanese Patent Laid Open H4-288361 (1992) filed by the same assignee as the assignee of the present invention, and in Japanese Patent Laid Open S63-226019 (1988). In the polarizable electrode materials described in these publications, as the means for maintaining the state of contact between activated carbon and an electrolytic solution, use is made of a porous solid material obtained by heating the mixture of powder or fibers of activated carbon and phenol resin in the atmosphere of an inert gas, and binding the activated carbon powder (or fibers) with carbonized phenol resin. A polarizable electrode for the electric double layer capacitor is obtained by impregnating the electrolytic solution into the solid material. Compared with a conventional polarizable electrode, namely, a polarizable electrode which is a pastelike mixture of activated carbon and an electrolytic solution, these polarizable electrodes have large density and low resistivity so that it is possible to further increase the capacitance per unit volume of the electric double layer capacitor and further decrease ESR mentioned above. In particular, the polarizable electrode according to the invention disclosed in Japanese Patent Laid Open H4-288361 has a large effect of increasing the capacitance and decreasing the resistance (ESR), and is mechanically strong. It is shown in the above-mentioned publication that it is possible to prolong the life for repetitious charging and discharging of a lead acid storage battery to about six to seven times that of the conventional value by combining the electric double layer capacitor which is formed by impregnating diluted sulfuric acid to the polarizable electrode, in parallel connection with the lead acid storage battery for vehicles. This example of application shows that the electric double layer capacitor is effective in the reduction of size and prolongation of life of an electric energy supply source in an electromechanical energy transducing mechanism such as actuator and motor.

Although new uses have been found through increase of capacitance and reduction of ESR as described in the above, there are still left unsolved problems in order to ensure its reliability. Namely, when the polarizable electrode is placed for a long time in a high temperature environment, the capacitance of the capacitor is decreased and the ESR is increased by the loss of the electrolytic solution. In contrast, in the newly explored use, that is, in the use for composing a power supply for driving the starter motor of vehicles by the combination with the lead acid storage battery, the capacitor is installed in an environment where vibration and impact are prevailing such as the engine room, so that it is indispensable to ensure the reliability under such an environment.

Generally, the electric double layer capacitor has a basic construction in which a pair of polarizable electrodes each impregnated with an electrolytic solution are housed stacked within the inner space of a gasket consisting of a thin frame of insulating material, with a sheet of a separator made of an insulating material placed in between. On the end faces of the gasket, there are respectively provided flat layers of collectors consisting of a conductive material so as to constitute a cover plate and a bottom plate of the gasket. These collectors act as terminal plates to the outside, of the pair of polarizable electrodes, and constitute also the sealing members together with the gasket.

In order to ensure the resistance to vibration and the resistance to impact of the capacitor, external mechanical pressures are applied to the pair of collectors in housing the aggregate in the gasket. For subjecting the collectors to the pressurizing process, the afore-mentioned polarizable electrode based on pastelike mixture according to the conventional technology is more suited than the solid material based polarizable electrode disclosed in the above-mentioned publication. In the latter case it is difficult to realize a sufficient resistance to vibration even after going through the pressurizing process. Namely, since it is necessary to press mold the polarizable electrode in advance, a gap, though slight, needs be provided between the gasket inner surface and the electrodes by considering the accuracy of the machine tool. Accordingly, the pair of polarized electrodes tend to slip out of place in planes parallel to the separator even after they are housed in the gasket, and the resistance to lateral impacts is weak.

SUMMARY OF THE INVENTION

It is therefore an object of this invention to provide a electric double layer capacitor which is excellent in resistance to vibration and resistance to impact and does not give rise to reduction of the capacitance and increase of ESR even after it is exposed to high temperature environment over a long period of time.

According to this invention, an electric double layer capacitor comprises a pair of polarizable electrodes consisting of a porous solid material each being impregnated with an electrolytic solution, a separator consisting of an insulating material inserted between these polarizable electrodes, a pair of collector members arranged respectively in the contact state of electrical conduction on both end faces of a laminate of the polarizable electrodes and the separator member, and a gasket member which houses the laminate in its interior and constitutes an airtight container for the laminate. There is provided a gap between the inner surface of the gasket and the laminate, and the gap is filled with fibers of glass or water absorbing polymer or the like which is impregnated with an auxiliary gellike electrolytic solution having common solute and solvent and effectively the same concentration as the above-mentioned electrolytic solution, or an equivalent liquid auxiliary electrolytic solution.

Since the capacitor according to this invention includes the gellike or liquid auxiliary electrolytic solution in the gap, the amount of the electrolytic solution within the airtight container is greater than in a conventional capacitor of the kind. Accordingly, it is possible to relax the effect of dissipation of the electrolytic solution, that is, reduction of the capacitance and increase of ESR even when it is placed in a high temperature environment for a long time.

Moreover, since the auxiliary electrolytic solution in the gap acts as a buffer to the vibration or impact externally applied to the electric double layer capacitor, it is possible to enhance its vibration resistance and impact resistance. Since, furthermore, the replenishment of the electrolytic solution by the auxiliary electrolytic solution does not depend on the liquid-form electrolytic solution, the breakage or the like of the airtight container will not be accompanied by splashings of the electrolytic solution.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DESCRIPTION OF THE PREFERRED EMBODIMENT

Figure 1:
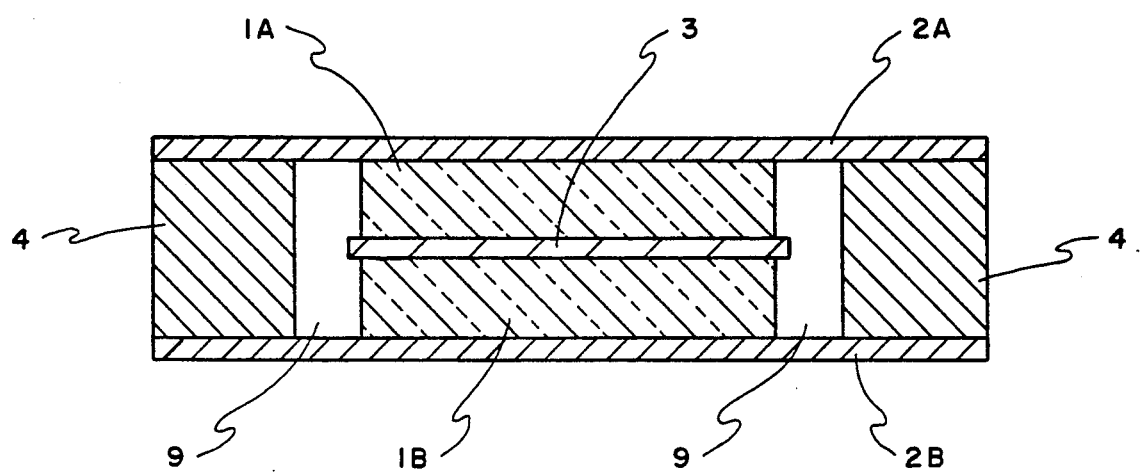
FIG. 1 is a sectional view of a prior art electric double layer capacitor.

Referring to FIG. 1 which schematically shows the electric double layer capacitor disclosed in Japanese Patent Laid Open H4-288361 (1992), this capacitor includes a pair of layers of polarizable electrodes 1A and 1B, and a sheet of a separator 3 inserted between these electrodes. The polarizable electrodes 1A and 1B are obtained by being subjected to heat treatment at a high temperature of about 1000° C. after formed in layer form from the mixture of powder of activated carbon and a phenol-based resin, and are impregnated with sulfuric acid of concentration of about 30 wt %. The activated carbon part of the polarizable electrodes 1A and 1B forms an electric double layer by selectively adsorbing positive ions ($H^+$) and negative ions ($SO_4^{2-}$) to the interface with the electrolytic solution. The separator 3 holds the polarizable electrodes 1A and 1B in the state of mutual isolation, and let the electrolytic ions in the electrolytic solution pass through it. With the configuration as shown in FIG. 1 the electric double layer capacitor becomes equivalent to the structure in which two electrode layers are placed facing with each other in electrolytic solution.

The laminated body of the polarizable electrodes 1A and 1B and the separator 3 is housed in a gasket 4 made of rubber, and a pair of layers of collectors 2A and 2B made of electrically conductive rubber are provided on the end surfaces of the gasket 4. The collector 2A is firmly adhered to the top surface of the polarizable electrode 1A and the gasket 4, and the collector 2B is firmly adhered to the bottom surface of the polarizable electrode 1B and the gasket 4. By so doing, these collectors 2A and 2B form terminal plates for external connection of the polarizable electrodes 1A and 1B, and form an airtight container for the electrolytic solution together with the gasket 4.

The electric double layer capacitor is fabricated through the process of forming in advance the respective ones of the polarizable electrodes 1A and 1B in the shape as shown in the figure, by inserting the separator 3 to laminate them, and housing the laminate in the gasket 4. Therefore, it is necessary to provide an appropriate amount of gap 9 between the inner surface of the gasket 4 and the outer surface of the laminate of the polarizable electrodes 1A and 1B and the separator 3 by taking the dimensional accuracy of the tools or the like during the process of assembly into consideration. Since the gap 9 permits the movement of the polarizable electrodes 1A and 1B in the direction parallel to the surface of the collectors 2A and 2B if a vibration or an impact is applied to the capacitor, the state of the close contact between these electrodes 1A and 1B and the collectors 2A and 2B is spoiled, increasing ESR. In addition, under the high temperature environment, the electrolytic solution impregnated in the polarizable electrodes 1A and 1B is evaporated, and leaks from the bonded part between the gasket 4 and the collectors 2A and 2B, so that it leads to a reduction of the capacitance and an increase of ESR.

Figure 2A:
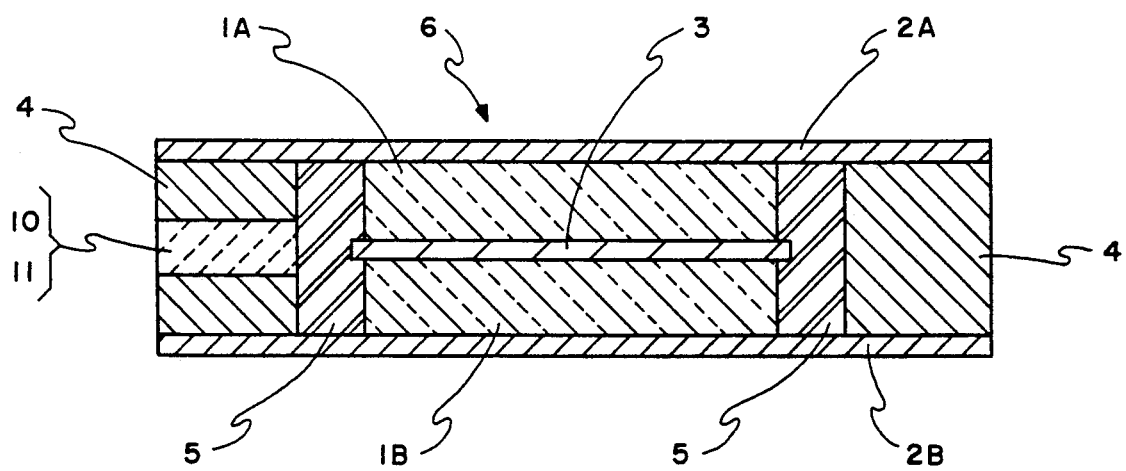
FIG. 2(a) is a structural sectional view of the electric double layer capacitor according to this invention.
Figure 2B:
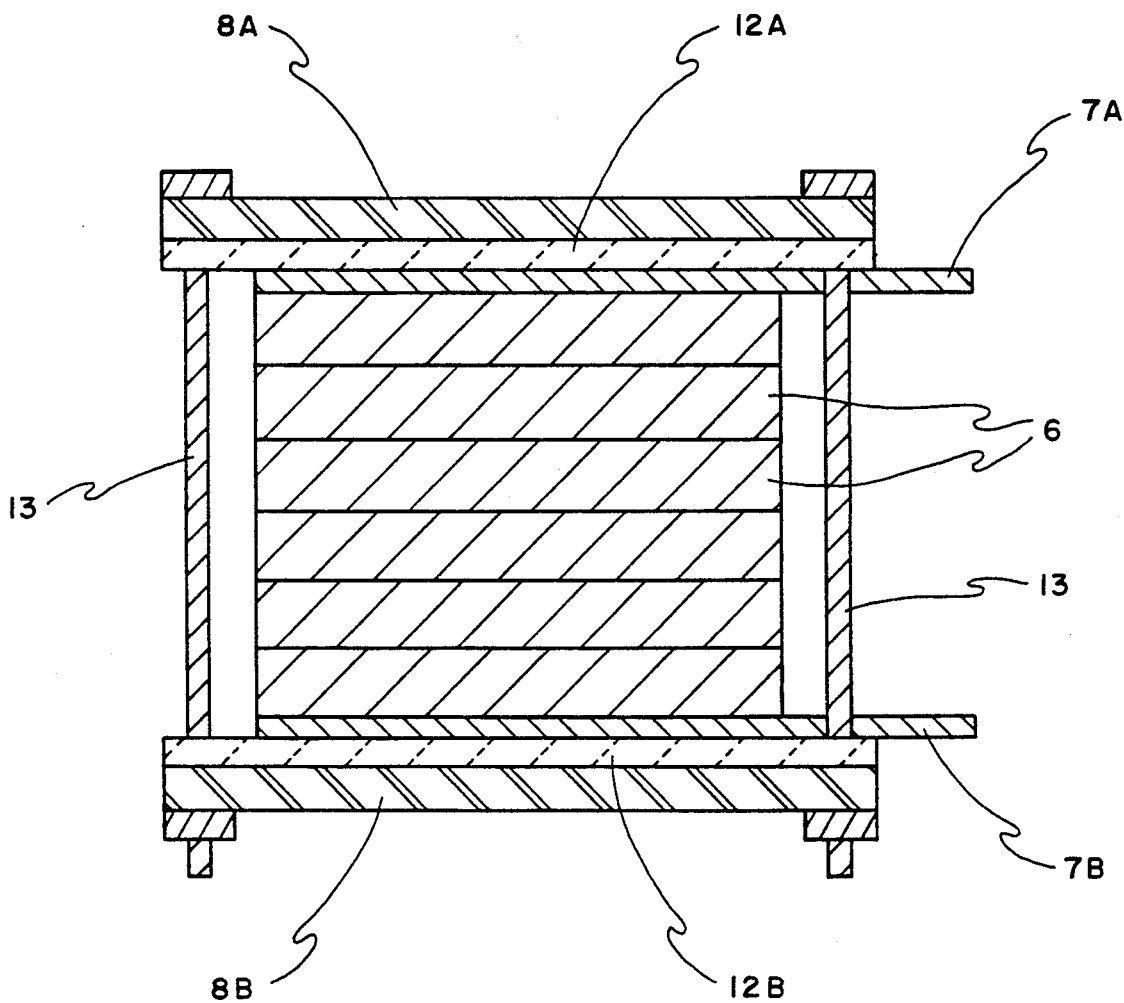
FIG. 2(b) is a side view of a laminated electric double layer capacitor formed by laminating the electric double layer capacitors.

Referring to FIG. 2, the electric double layer capacitor according to this invention has a gelatinous electrolytic solution 5 or a holder of the electrolytic solution which fills the gap 9 (see FIG. 1). Namely, the electric double layer capacitor has an auxiliary electrolytic solution which includes a solute and a solvent nearly the same as those of the electrolytic solution and has nearly the same concentration, in addition to the electrolytic solution impregnated in the polarizable electrodes 1A and 1B. Accordingly, the electric double layer capacitor according to this invention includes larger amount of electrolytic solution than in the conventional electric double layer capacitor. Therefore, it will give rise to neither the reduction of the electrolytic solution nor the accompanying decrease of the capacitance and increase of ESR even under the high temperature environment, since a buffer member against external vibration or impact can be formed by the adoption of a gallike electrolytic solution or glass fibers with impregnated liquid electrolytic solution instead of injecting a liquid electrolytic solution to the gap 9, the resistance to vibration and the resistance to impact of the capacitor can be improved.

A more detailed fabrication process of the electric double layer capacitor according to this embodiment will now be described.

First, phenol-based powdered activated carbon and powder-form phenol-based resin are measured so as to have the weight ratio of 70:30, and they are mixed dry by using a high speed dry mixer. The time for mixing is four hours. Next, after thermally pressing this mixture at 180° C. to form a rectangular plate of length (L) of 70 mm, width (W) of 50 mm, and thickness (t) of 4 mm, and this platelike compact is subjected to a heat treatment at 1000° C. for two hours to convert it to activated carbon. Since an isotropic contraction of about 10% takes place during the heat treatment for carbonization, the dimensions of the activated carbon after the carbonization are L=6.3 mm, W=4.5 mm, and t=3.6 mm.

Next, using this activated carbon plate and the polarizable electrode 1A, and using conductive rubber, given electrical conductivity through dispersion of carbon in butyl rubber, as the collector 2A, and both are placed one on top of the other to be thermally united by pressing under the conditions of pressure of 10 kg/cm$^2$, temperature of 80° C., and time of 30 seconds. Similarly, the polarizable electrode 1B and the collector 2B are closely bonded to be united.

On the other hand, a rectangular platelike piece of butyl rubber with L=80 mm, W=60 mm, and t=8 mm is prepared, and a gasket 4 resembling a picture frame is formed by cutting out the inside part by leaving portions of 5 mm width for each side. In one of the sides of the gasket 4 there is provided a through hole 10 with circular cross section of 3 mm diameter that extends in and out of the gasket in a plane parallel to the plane of the gasket. In addition, a separator 3 consisting of porous polyethylene with L=70 mm, W=50 mm, and t=0.1 mm is prepared.

Next, after inserting the porous separator 3 between the unified body of the polarizable electrode 1A and the collector 2A, and the unified body of the polarizable electrode 1B and the collector 2B, and housing the aggregate in the gasket 4, a unified body is obtained by bonding the collectors 2A and 2B and both end surfaces of the gasket 4 by thermocompression (for details, see lines 20-24, p.27 of Japanese Patent Laid Open H4-288361 (1992)).

After removal of gas in the collector/polarizable electrode/gasket structure obtained by going through the aforementioned process by sucking it out from the through hole 10, diluted sulfuric acid of 30 wt % is injected to the polarizable electrodes 1A and 1B via the same through hole 10 to be impregnated in their interior. After this process the excess diluted sulfuric acid is drained out from the through hole 10.

Next, after injecting the mixed solution of colloidal silica solution (silica sol) containing 40 wt % of silica (silicic acid anhydride) and 96 wt % concentrated sulfurnic acid in the volume ratio of 50:7 to the interior of the gasket 4 via the through hole 10, the through hole 10 is sealed by an adhesive 11. The mixed solution corresponds to diluted sulfuric acid of concentration 20 wt %, and at the initial period of mixing it is a solution with low viscosity comparable to 20 wt % diluted sulfuric acid, but it is gelled at about one hour after injection into the gap. Although the above-mentioned silica sol is in a quasi stable state in the form of sol in the pH range of 2 to 4, if the pH value shifts from the above range either to acid side or to alkali side, then the balance of the surface charge of the silica particles is destroyed and the silica sol is gelled. In this embodiment, sulfuric acid in the gap is gelled utilizing the strong acidity of sulfurnic acid used as the electrolytic solution. Since this silica sol exhibits similar gelation phenomenon not only in an inorganic solvent, but also in a polarizable organic solvent, namely, in a solvent of an organic electrolytic solution, an effect similar to that in this embodiment can be obtained in a capacitor which uses diluted sulfurnic acid as the electrolytic solution as well as in a capacitor which uses an organic electrolytic solution. Accordingly, selection becomes possible as to the use of diluted sulfurnic acid as the electrolytic solution for a capacitor for which low ESR is required, and the use of an organic electrolytic solution for a capacitor for which high breakdown voltage is required. As a compound which exhibits gellation phenomenon similar to silica sol one may point out alumina sol. In contrast to the fact that silica sol is not easy to use in an alkaline electrolytic solution due to dissolution of silica in the strong alkalinic range, alumina is stable to both acidity and alkalinity, so that it makes it possible to use the solution of potassium hydroxide of 20 - 30 wt % concentration as an electrolytic solution, extending the range of selection for the electrolytic solution. Moreover, since silica sol and alumina sol can be very well mixed uniformly, not only they can be used independently, but also they can be used as a mixture.

The following modifications are possible for the embodiment in the above.

Modification 1

To fill the gap 9 (see FIG. 1) with quartz wool 5 (see FIG. 2(*a*)), and impregnate the wool with 30 wt % diluted sulfuric acid containing no silica sol.

Modification 2

To fill the gap 9 with a water absorbing polymer 5 in place of quartz wool. The polymer 5 is polymer material powder with diameter of several hundred micrometers polymerized with acrylic acid, which can absorb water of 300 to 1,000 times its own weight. This water absorbing polymer is impregnated with 30–40 wt % diluted sulfuric acid.

A stacked type electric double layer capacitor (stacked capacitor) as shown in FIG. 2(*b*) is formed by stacking 6 pieces of electric double layer capacitors (unit capacitors) obtained by going through the above-mentioned process. The number of unit capacitors to be stacked can be selected appropriately corresponding to the magnitude of the breakdown voltage required.

This stacked capacitor has on the top end surface of a laminate consisting of six unit capacitors 6, an electrode terminal plate 7A, an insulating plate 12A, and a metallic pressurizing plate 8A, and has an electrode terminal plate 7B, an insulating plate 12B, and a pressurizing plate 8B on the bottom end surface. The laminate of the unit capacitors is pressurized by means of bolts 13 provided at the four corners of the pressurizing plates 8A and 8B. This pressurization is for reducing the mutual contact resistance between the unit capacitors 6, and the pressurizing plates 8A and 8B are for giving sufficient rigidity so as to uniformize the pressurization. The breakdown voltage of the stacked capacitor is about 7.2 V which is six times the breakdown voltage about 1.2 V of the unit capacitor 6.

The result of comparison between the stacked capacitors according to this embodiment and its modifications, and a 6-layer stacked capacitor consisting of unit capacitors by the prior art, subjected to performance tests briefly described below, is as shown in Table 1.

TABLE 1

|  | Initial Value | | Ratio of Change | |
| --- | --- | --- | --- | --- |
|  | C (F) | ESR (mΩ) | C/C (%) | ESR/ESR (%) |
| This Embodiment | 168.5 | 193.5 | −3.2 | 2.1 |
| Modification 1 | 162.3 | 182.2 | −4.1 | −1.5 |
| Modification 2 | 164.4 | 179.4 | −4.6 | 1.1 |
| Prior Art | 162.1 | 182.5 | −15.5 | 320 |

(1) After a stacked capacitor of testing object was left standing for 240 hours at 70° C. in the state where a voltage of 5.0 V was applied, the electrostatic capacity was measured subsequent to full discharge, to determine the radio ΔC/C (%) of the variation ΔC of the capacitance to its initial value C. The measurement of the capacitance value was taken by continuously applying 5.0 V to the capacitor for six hours, carrying out constant current discharge at 0.1 A, and determining the time for the terminal voltage of the capacitor to change from 3.0 V to 2.5 V.

(2) The ratio ΔESR/ESR (%) of the variation ΔESR to the initial value ESR was determined by changing the mechanical oscillation number of the capacitor from 10 Hz to 2000 Hz during the period of 2 hours. The measurement of ESR was performed by measuring the impedance at the test signal frequency of 1 kHz by the ac four-terminal method and evaluating its real part.

As shown in Table 1, although the initial values of the capacitance and ESR of the stacked capacitor according to this invention are approximately the same as those of the prior art, following the above-mentioned performance test (1) (high temperature load test) the ratio of change of the capacitance was about ¼ to 1/5 of the ratio of change of the comparision object (−15.5%), showing a marked improvement. In addition, after the performance test (2) (vibration test), in contrast to an increase of 320% of ESR for the comparison object, the ESR changes for samples according to this invention are negligibly small, showing high stability.

In the unit capacitors for this embodiment and its modifications, the laminated structure of polarizable electrode 1A, separator 3 and polarizable electrode 1B is formed by pressure bonding. However, a structure in which the respective polarizable electrodes do not make direct contact with the separator, as in Embodiment 17 of Japanese Patent Laid Open H4-288361 (1992) may also be adopted.

As described in the above, the electric double layer capacitor according to this invention can ensure vibration resistance and impact resistance and prevent the reduction of the capacitance and the increase of ESR accompanying an operation over a long period of time under high temperature environment, by filling the space between the inner surface of the gasket and the outer surface of the polarizable electrode-separator laminate with an auxiliary electrolytic solution such as quartz wool containing gelatinous diluted sulfuric acid or an equivalent liquid diluted sulfuric acid, or a water absorbing polymer.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. An electric double layer capacitor comprising: a pair of polarizable electrodes consisting of a porous electrically conductive solid material impregnated with an electrolytic solution, a ion permeating separator member consisting of an insulating material inserted between said polarizable electrodes, a pair of collector members arranged respectively in electrically conductive manner on both end surfaces of a laminated body of said polarizable electrodes and said separator member, and a gasket housing said laminated body therein to constitute an airtight container for said laminated body by being bonded to said collector members, a gap being provided between inner surface of said gasket member and said laminated body, such that said gap is filled with an electrolytic solution holding body impregnated with gellike auxiliary electrolytic solution having the solvent and the solute common to, and having an effectively identical concentration to, said electrolytic solution or an equivalent liquid electrolytic solution.

2. A electric double layer capacitor as claimed in claim 1, wherein said gelatinous auxiliary electrolytic solution is obtained by gelation of the mixture of a sol solution containing either one of silica or alumina or a mixture of these two compounds and an electrolytic solution having a concentration higher than that of said electrolytic solution.

3. A electric double layer capacitor as claimed in claim 1, wherein said electrolytic solution holding body consists of either one of a fibrous glass, a ceramic, and a plastic.

4. A electric double layer capacitor as claimed in claim 1, wherein said electrolytic solution holding body is a water absorbing polymer.

5. A electric double layer capacitor as claimed in claim 1, wherein said electrolytic solution is an aqueous solution of sulfuric acid.

* * * * *